United States Patent
Overman et al.

(10) Patent No.: US 11,580,573 B2
(45) Date of Patent: Feb. 14, 2023

(54) FAN EXPERIENCE RECOMMENDATION SYSTEM AND METHOD

(71) Applicant: FanThreeSixty, LLC, Kansas City, MO (US)

(72) Inventors: Caleb Overman, Kansas City, MO (US); Sasha Victorine, Kansas City, MO (US)

(73) Assignee: FanThreeSixty, LLC, Leawood, KS (US)

( * ) Notice: Subject to any disclaimer, the term of this patent is extended or adjusted under 35 U.S.C. 154(b) by 63 days.

(21) Appl. No.: 16/515,635

(22) Filed: Jul. 18, 2019

(65) Prior Publication Data

US 2020/0034878 A1 Jan. 30, 2020

Related U.S. Application Data

(60) Provisional application No. 62/702,585, filed on Jul. 24, 2018.

(51) Int. Cl.
| | |
|---|---|
| *G06Q 30/00* | (2012.01) |
| *G06Q 30/0251* | (2023.01) |
| *G05B 19/418* | (2006.01) |
| *H04W 4/80* | (2018.01) |
| *H04W 84/12* | (2009.01) |

(52) U.S. Cl.
CPC ..... *G06Q 30/0252* (2013.01); *G06Q 30/0261* (2013.01); *G06Q 30/0269* (2013.01); *H04W 4/80* (2018.02); *H04W 84/12* (2013.01)

(58) Field of Classification Search
CPC ........... G06Q 30/0252; G06Q 30/0261; G06Q 30/0269; H04W 4/80; H04W 84/12
See application file for complete search history.

(56) References Cited

U.S. PATENT DOCUMENTS

| | | | |
|---|---|---|---|
| 2009/0070204 A1 | 3/2009 | Clancy, Jr. et al. | |
| 2013/0066731 A1* | 3/2013 | Finnegan | H04M 3/42 705/15 |
| 2014/0006129 A1 | 1/2014 | Heath | |

(Continued)

FOREIGN PATENT DOCUMENTS

CN 113271480 A * 8/2021 ......... G06F 16/2358

OTHER PUBLICATIONS

"Ticket-purchase behavior under the effects of marketing campaigns on facebook fan pages". (Year: 2017).*

(Continued)

*Primary Examiner* — Maria V Vanderhorst
(74) *Attorney, Agent, or Firm* — Erise IP, P.A.

(57) ABSTRACT

Method, system, and media for improving a fan experience for an event at a venue with a live audience. Broadly speaking, embodiments of the invention provide techniques for systematizing fan interactions based on automatically detected fan groupings and criteria triggering activation events. Fans are classified into audience groupings based on collected data associated with each fan. Fan interactions map activation criteria (such as activities performed by the fan or purchases made by the fan, information about the event, or the ambient conditions) to activation events that can collect additional data about the fan, incentivize the fan to make a purchase, or improve the fan experience in some other way.

20 Claims, 3 Drawing Sheets

(56) References Cited

U.S. PATENT DOCUMENTS

2015/0051949 A1* 2/2015 Pickton .............. G06Q 30/0202
                                                    705/7.31
2015/0262214 A1   9/2015 Geer
2015/0363811 A1* 12/2015 Candillier .......... G06Q 30/0236
                                                    705/14.19

OTHER PUBLICATIONS

Understanding sporting fandom in social media: A UK perspective of professional Rugby League clubs.IEEE. 2016 (Year: 2016).*
PCT Patent Application PCT/US2019/042409; International Search Report and Written Opinion; dated Oct. 17, 2019.

* cited by examiner

FAN EXPERIENCE RECOMMENDATION SYSTEM AND METHOD

RELATED APPLICATION

This non-provisional patent application claims priority benefit, with regard to all common subject matter, of earlier-filed U.S. Provisional Patent Application No. 62/702,585 filed Jul. 24, 2018 and entitled FAN EXPERIENCE RECOMMENDATION SYSTEM AND METHOD. The identified earlier-filed provisional patent application is hereby incorporated by reference in its entirety into the present application.

BACKGROUND

1. Field

Embodiments of the invention relate to providing a unique experience to a fan. More specifically, embodiments of the invention relate to enhancing a fan experience by acquiring information related to the fan and using the information to provide a unique experience for the fan.

2. Related Art

Collecting information from a person can be difficult. More specifically, collecting useful information from a fan at a sporting event can be difficult. Typically, a large amount of data must be collected then analyzed to determine what data may be useful or generic offers are sent based on small amounts of general information such as, for example, gender. Further, it is typically difficult to collect some information from fans since fans may be unwilling to provide personal information. This results in systems that are slow and process large amounts of data or, more commonly, systems that are not user specific and provide generic offers to all users. As a result, the offers and deals that are provided to the fans may remain unutilized since they seldom relate to the fans individually. Another common trend is that the fans provide inaccurate information that further results in unrelated offers. What is needed is a system for providing fan specific offers and deals and a method for determining the offers and deals that a fan wants. Further, what is needed is a system and method for determining valuable attributes for each fan based on information related to the fan and other fans and using specific contexts in which to acquire the attributes with a high likelihood of the fan offering information related to the attributes. In this way, useful information can be collected from the fan with a high rate of success as compared to current methods.

SUMMARY

Embodiments of the invention address the above-described need by providing for a variety of techniques for improving the fan experience via recommendations and other offers. In particular, in a first embodiment, the invention includes a method for improving a fan experience, comprising the steps of: receiving a datum associated with a fan; assigning the fan to an audience group based at least on the received datum; determining an interaction associated with the audience group, wherein the interaction comprises an activation criterion for the fan and an activation event; detecting that the activation criterion has been satisfied for the fan; and responsive to the step of detecting, triggering the activation event for the fan.

In a second embodiment, the invention includes system for improving a fan experience, comprising a data store storing a plurality of interactions, each interaction of the plurality of interactions comprising an audience group for the interaction, an activation criterion for the interaction, and an activation event for the interaction; and a smartphone associated with a fan, comprising: a processor; a display; and one or more non-transitory computer-readable media storing computer-executable instructions that, when executed by the processor, perform a method of improving the fan experience, the method comprising steps of: receiving a datum associated with the fan; determining, based at least on the datum, and audience group for the fan; retrieving, from the data store, an interaction for the fan, wherein the audience group for the interaction for the fan matches the audience group for the fan; detecting that the activation criterion for the interaction for the fan has been satisfied; and triggering the activation event for the interaction for the fan responsive to the detecting.

In a third embodiment, the invention includes one or more non-transitory computer-readable media storing computer-executable instructions that, when executed by a processor, perform a method of improving the fan experience, the method comprising steps of receiving a datum associated with a fan; assigning the fan to an audience group based at least on the received datum; determining an interaction associated with the audience group, wherein the interaction comprises an activation criterion for the fan and an activation event; detecting that the activation criterion has been satisfied for the fan; and responsive to the step of detecting, triggering the activation event for the fan.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
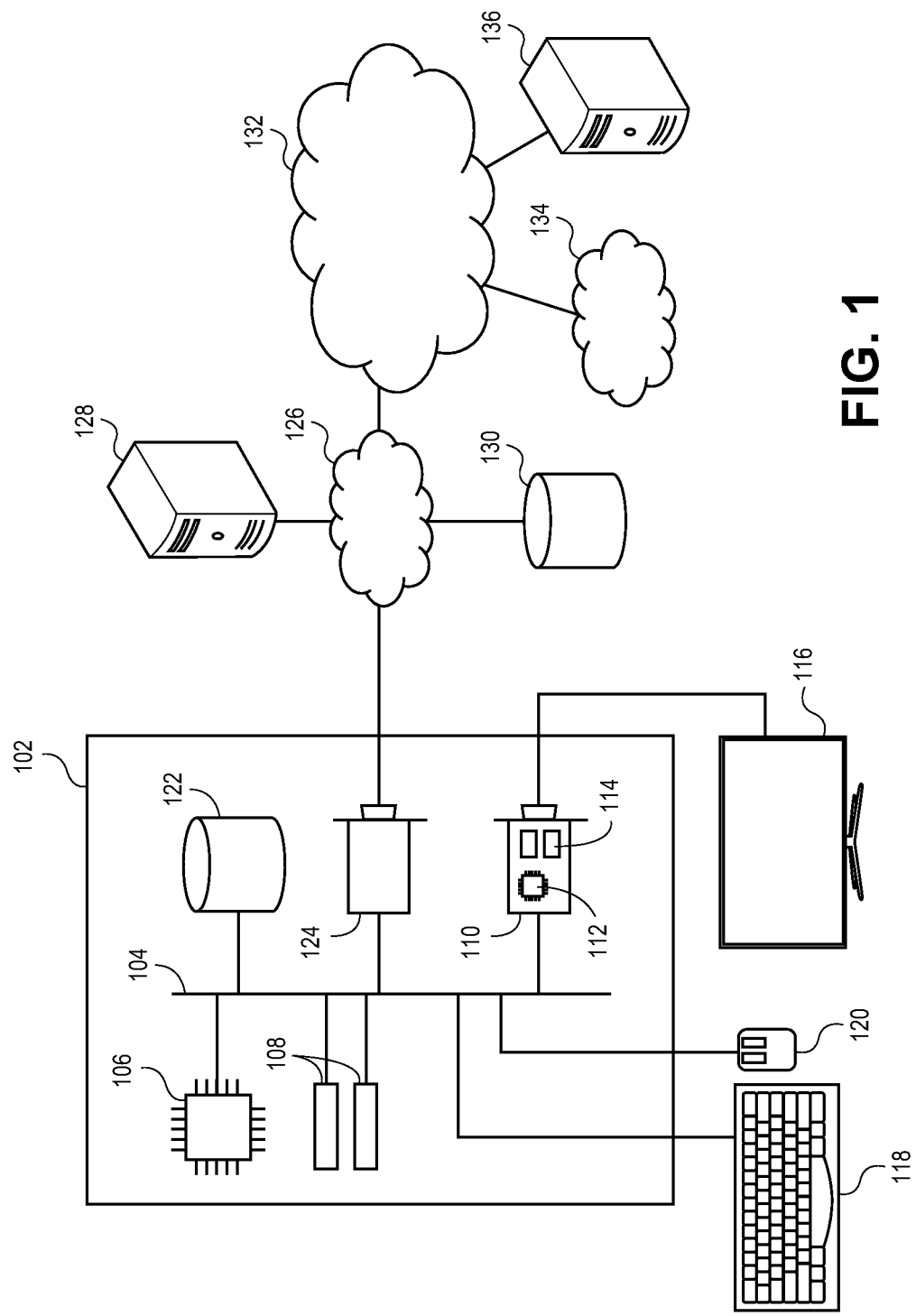
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing a method and system for providing a unique fan experience at a sporting event. The system may provide a downloadable application or an application that is accessible over the Internet. The application may collect data from fans and determine if further information may be valuable to the fans or sporting event management. Upon determination that the application can be further customized to provide the fan with a unique experience, the application initiates a process for collecting the fan attributes. The fan attributes may be placed in a hierarchical order, or priority list, based on a value associated with a possible outcome of acquiring the fan attribute. The priority list may then be adjusted based on contexts such as a location and a time that may provide a higher likelihood of acquiring each fan attribute. The priority list may be adjusted in real time based on the movements and activities of the fan, other fans, and the progress of the sporting event. Using this knowledge of the fan base, the sporting event management may provide an efficient interaction between the fans and the sporting event management. This may result in a customized and unique experience provided to the fan based on the fan attributes.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Broadly, embodiments of the invention provide a system that may enhance fan experience by providing a customized and unique experience for the fan. The system provides a downloadable application that interfaces with the user. The user may be a fan at a sporting event and provide information to the application. The information, or fan attributes, may provide sporting event management a high level of useful knowledge of their fan base. Using this knowledge of the fan base, the sporting event management may provide an efficient interaction between the fans and the sports management. This may result in a customized and unique experience provided to the fan based on the fan attributes.

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, the application may run on a computer or mobile device or be accessed via the computer or mobile device and run in a web-based environment from the recipient's web browser. The web-based environment may store data such that it is not required for the mobile device or computer to have downloaded and stored large amounts of data for the application. The application may access data such as object databases, user profiles, information related to other users, financial information, third party financial institutions, third party vendors, social media, or any other online service or website that is available over the Internet.

Broadly, in some embodiments, the invention provides a system and method for customizing a fan experience at a sporting event. In some embodiments, the user accesses an application via a mobile device and creates a profile. The application may be associated with a particular sports team or location and may provide the user with benefits associated with the same. The application may analyze the user information to create a hierarchy of information that is need to enhance the fan's experience. The application may associate a list of attributes with the fan along with a hierarchy of the attributes. Some attributes may be known, some unknown, and specific contexts for obtaining the unknown attributes may also be associated. By relating the unknown attributes to successful methods of obtaining the unknown attributes, the application may obtain information from the user with a high likelihood of success. The attributes may be ranked in a hierarchical way such that attributes determined to have a high value outcomes are ranked highest. Attempts to acquire the highest-ranking attributes may be more aggressive. The ranking of the attributes may also change in real time based on the likelihood of acquiring the attribute with the highest-ranking attributes being more likely to be acquired. The likelihood of acquiring the attributes may be determined by context such as time, location of the fan, environment, or another context in which the attribute may be acquired.

Figure 2:
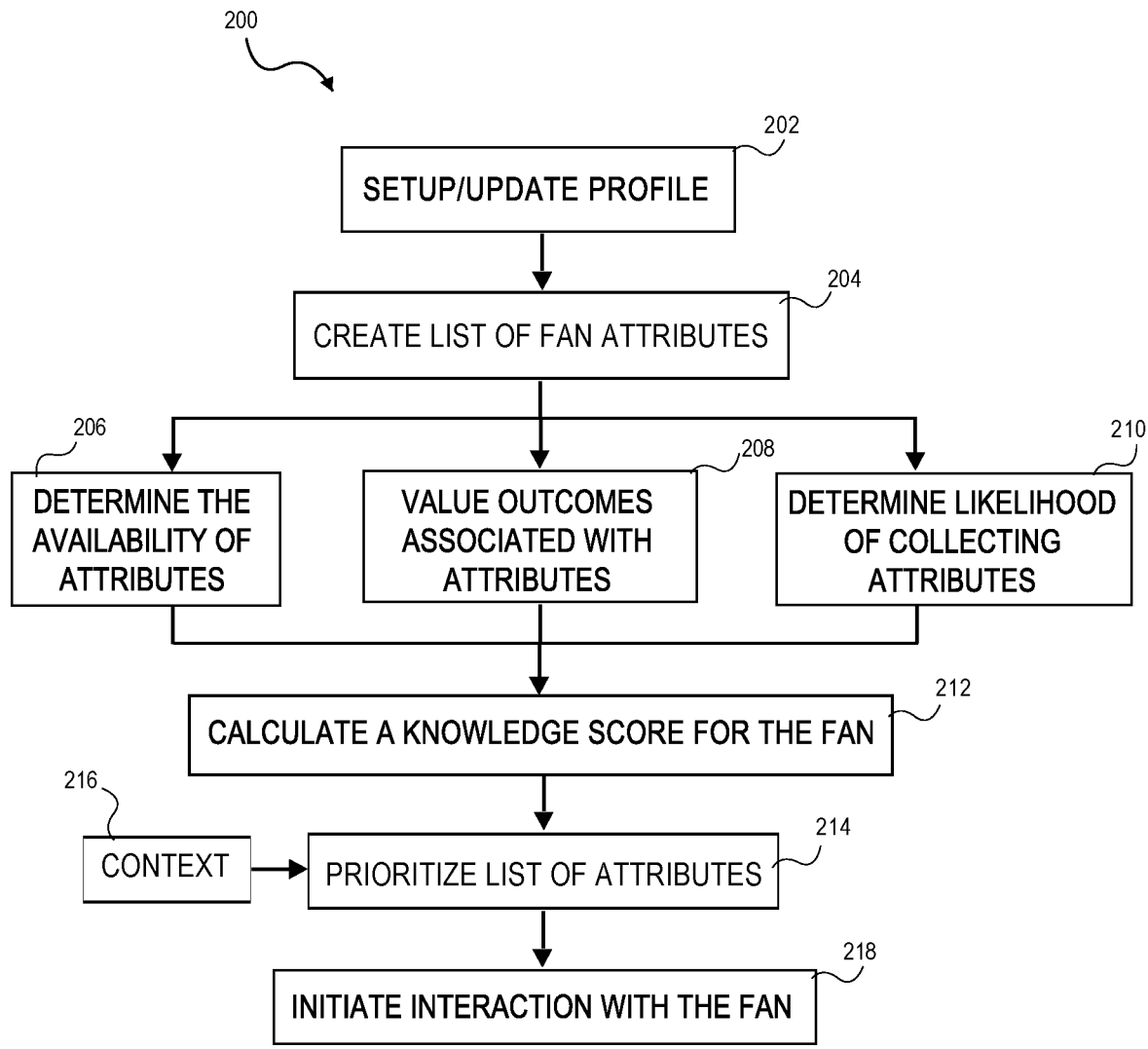
FIG. 2 depicts a flowchart showing the operation of a first method in accordance with embodiments of the invention.

Some embodiments of the invention may be represented by the exemplary method 200 depicted in FIG. 2. Initially at step 202, the application may be downloaded on a mobile device or computer or accessed via the Internet or in a cloud based application. The fan, in the case of a new user, may be prompted to set up a profile for use with the application. The fan may input such exemplary items as age, race, nationality, favorite teams, favorites players, favorite arenas, favorite venue to watch games outside of the arena, favorite seats or locations within the arena, smoker or nonsmoker, or any other information that may be used to create customized offers and a unique experience for the fan. This information may be a set of fan attributes. The information that the fan provides that is related to fan attributes may be known attributes. The fan attributes may be provided through predetermined questions provided to the fan and may comprise a base set of data for the application to use to categorize the fans. For example, the fan may download the application and input the base information prior to attending a sporting event. The application determines that the fan is between the ages of 18 and 35, a smoker, and possibly drinks alcohol. The alcohol consumption attribute may be labeled as an unknown attribute and given a ranking on the priority list discussed in detail below.

At step 204, the application may take the information related to the fan and create a list of fan attributes specific to each fan. The list of fan attributes may include information received from the fan and may include information that the application or sporting event management may value. The information valued may be based on a history of data that is valuable from similar fans or fans in a same or similar category as the fan. The information provided by the fan also may lead to valued attributes or a prioritization of the attributes on the list. For example, the fan may be a low-level loyalty member and season ticket holder. The application may associate the fan with other similar fans to create a prioritized list of attributes for the fan. The fan may be a smoker so the application determines that the fan may attend the designated smoking areas and may buy cigarettes at designated kiosks. These actions put the fan in specific locations that may be used to provide the fan a unique experience. For example, the fan may be offered discounted beverages at a nearby concession stand. The application may request the fans date of birth and upgrade the offer to an alcoholic beverage if the date is provided. This may increase the likelihood of collecting an age attribute.

At step 206, the application determines the availability of an attribute. The availability of an attribute may be a determination of whether or not an attribute needs collecting or is available for collection. For example, an attribute such as date of birth may have already been collected. It is not necessary to collect this information again since this information is unchanging. However, data that may have already been collected may need updating. This may be time or situation based collection. For example, annual income may change on a year-to-year basis and needs updating at least once a year. At the beginning of each year an annual income attribute may move up the rankings as a higher priority attribute. The attribute may have a live and dormant designation such that when an attribute is dormant there is no collection planned or no ranking for the attribute. When the attribute is designated as live, a collection is planned and the attribute is ranked. In this example, at the first of the year the annual income attribute goes live and a collection is planned. Since the fan has been willing to easily provide this information in the past, the application sends a request for an income update and the fan provides the new information. Once the information is updated on the fan profile the attribute goes to a dormant state and is scheduled to go live again in one year. If the fan has been unwilling to provide this information, a context may be used to collect the information as will be discussed in detail below.

At step 208, the application manager, or sporting team management, may provide a set of values for outcomes associated with the attributes. The values may provide the ranking system for the attributes such that some attributes are more valuable, or have higher priority, than other attributes based on the outcome that may result from the application using the known attribute. For example, a valuable outcome may be a fan upgrading their season tickets. In order to provide the fan with the best options for season tickets, or in order to increase the likelihood that the fan upgrades the tickets, high priority may be given to acquiring the fan's income information. By using the fan's income, the application can suggest an upgrade, or special offer, that is likely to be in the fan's price range.

Alternatively, the fan may upgrade their season tickets from lower priced seats to higher priced seats. It may be determined through accessing historical data that this action has a high likelihood of signifying the fan's income has increase. The income attribute may go from dormant to live and the income attribute may be given a high priority.

Values may be provided to the application by the sporting event management or may be learned and updated over time.

The system may change the values of the outcomes based on underlying attributes according to the value of the outcomes.

At step 210, the application may access a stored history of fan information, or past fan attributes, to determine a difficulty level or likelihood of collecting data attributes from the fan. A history of data collection may be stored in a data store and a likelihood of collecting each attribute may be determined by analyzing the historical data. Further, a likelihood of collecting each attribute with each context may also be determined. This may provide the application with a structure for determining which attribute should be collected and when the most likely time is to attempt to collect the attribute. For example, the fan may walk near a beer tent. The application recognizes that the fan is near the beer tent using the Global Positioning System (GPS) receiver on the fan's mobile device. Recognition of the fan's location may also be performed with affirmative position via GPS location or geofencing, proximity detection (beaconing) via Bluetooth (or BLE), WiFi, or radio-frequency identification tags, customer interaction detection at a known location (e.g., scanning a loyalty card, scanning a mobile ticket, interaction with a point-of-sale system, or facial recognition), or any other method of location determination or proximity sensing. Upon walking near the beer tent the application may send the fan a notification offering a free beer for inputting the fan's birth date. The fan's profile is updated with the birthdate and the fan may get the beer using an application loyalty member card or scanning the fan's mobile device.

At step 212, the application may calculate a knowledge score. The knowledge score may be indicative of an overall understanding, or knowledge, that the application has for the fan. The knowledge score may be based on known vs unknown attributes. For example, the application may have assigned twenty attributes to the fan. The fan may have provided information regarding ten of the twenty attributes. This may result in a knowledge score of fifty percent since there are ten known attributes and ten unknown attributes. The aggressiveness of the application in obtaining information may be based on the knowledge score or on the rank of information. A different knowledge score may be assigned based on the value of the attributes obtained.

Further, the knowledge score may be used to determine fan information, or attributes of the fan, that need to be collected. The knowledge score along with the values of the attributes may be used to determine how aggressive the application is in attempting to acquire the information. For example, the attributes may be weighted such that the sum of the values is always a number, for example, 100. Four attributes are valued and labeled with high priority. The attributes are weighted such that attribute income is 30, age is 25, gender is 25, and favorite player is 20. The fan provides information for age and favorite player such that the knowledge score is 45 out of a possible 100. The application may more aggressively attempt to acquire information related to income since this is the highest value unknown attribute.

At step 214, the application may combine context 216 about the point of interaction with the fan to prioritized the list based on a best action to likely increase knowledge score. This context may be location, time, events, and actions. The context may be provided by the fan or initiated by the application and may provide a structure for attempting to acquire unknown attributes. Contexts that provide a higher likelihood of collecting the unknown attributes may be determined from historical statistics or assigned. Data may be collected on social media to use as context or collected from the fan's mobile device's instruments such as accelerometer, gyroscope, or GPS receiver. The application may also provide information to create context. For example, the application may send a notification to the fan "Head to the concession stand and get a half price beer. Input your date of birth and there will be no need to show your ID." The age is then associated with the loyalty account that may be accessed by paying and scanning with the fan's mobile device.

The prioritized list may be accessed and associated with the collected attributes to determine if an action should be taken. The prioritized list may be updated dynamically when any change is recorded on the user's profile or relative to a detected context. An attribute may be higher in the priority list but this may be overruled by a change to the user's profile, an external user's profile, or a context. A lower ranking attribute may be moved higher on the list based on any of these changes. A higher probability for obtaining a second or third ranked unknown attribute may be determined based on the context therefore the highest-ranking attribute may be skipped and an effort to collect the third ranked unknown attribute is initiated. For example, gross income of the fan may be assigned a higher value since the outcomes associated with the income data may be more beneficial to the application and the sporting manager than age. However, in certain embodiments, age may take priority in certain contexts as described in the exemplary embodiment below.

Further, the prioritized list may be changed based on a change to the user's profile or an external profile owned by the user. This change may be initiated by the user or the application may automatically change the prioritized list based on new information. The new information may be a context as described above or may be from an external source, or an external account, associated with the user such as a social media source or other user profile. For example, the user may create a new profile on a website that has different information than the application based user profile or the user may purchase on item or sign a child up for little league. The application may use this information to create offers, incentives, or marketing. For example, the user may sign their child up for a little league soccer team and the application is notified of the user's new account. The user's profile is updated with relevant information and the prioritized list is updated. The application sends the user a notification of youth appreciation night at the arena and any child in the little league gets in free. The application may work collaboratively and dynamically with the websites and profiles of partners to update the priority list and provide the user with a unique experience.

At step 218, interaction with the fan is performed. The fan may enter a beer tent, as described in the example above, which is sensed using GPS or proximity scanners associated with the fans mobile device. Through historical data analysis it may be determined that there is a high likelihood of obtaining a fans age at the beer tent since the fan must be of a certain age to consume alcohol. The application may make this the highest priority and a request may be sent to the fan's mobile device requesting the fan's birth date. The actions taken may be requests such as the one described in the example above, or may be notifications of offers, or may be visual, auditory, or tactile alerts. If it is determined that action should not be taken, the process returns to step 204 where the data is updated and the process can continue with the new information and the updated data.

In some embodiments, the application may access features of the mobile device such as an accelerometer, gyroscope, GPS, or camera. The application may sense that the mobile device has been raised such as when a fan raises their arms in excitement. The application may use this moment as context to gain fan information for unknown attributes. For example, the application senses that the fan is excited by the movements of the fan's phone. The application may recognize that the fan does not have tickets to the next game so, before the excitement wears off, the application offers the fan discounted tickets for the next game. The offer may be provided such that the offer expires in a limited amount of time, or the fan may provide information for a priority attribute to receive the discount on the tickets.

The application may access information through marketing partners. For example, the application may have attributed to the fan that the fan is a home owner or in real-estate, the application may use a mortgage lender to send an advertisement such as "interest rates are at an all-time low refinance with us!" The application may then collect financial and credit information to use for fan attributes. Since this information may benefit the fan the application may also associate this information with a possible high likelihood of the information provided by the fan being accurate. Similarly, the marketing partner may be a grocery store and the fan may not be in attendance at the game but shopping. The application may sense from GPS location that the fan is at the grocery store and send a notification to the fan that tailgate equipment such as charcoal, grates, grills, and the like are on sale when the fan upgrades their loyalty status.

The application may track the success of the attempts to acquire information. The application may present the same or similar information in different ways and evaluate the success. This may provide some insight into the psychology of the fans and may be evaluated on a user-per-user basis or groups of users. This may be used to provide more efficient methods for acquiring the attributes while being acceptable to the fans.

The user may be sent questionnaires to assist in customizing the experience to the user's preferences. Some embodiments of the invention utilize machine learning, neural networks, fuzzy logic, or any other statistical, or general mathematical algorithm or artificial intelligence to increase the efficiency of the application and create a more user-friendly experience. The mathematical algorithms may be used for offering incentives based on online databases such as social media or user location, user demographics, or the user profile updated in real time. The mathematical algorithms may be used along with user feedback to increase customer satisfaction. Positive feedback may be used to strengthen the positive experiences thus increasing the likelihood of positive experiences and decreasing the likelihood of negative experiences.

Figure 3:
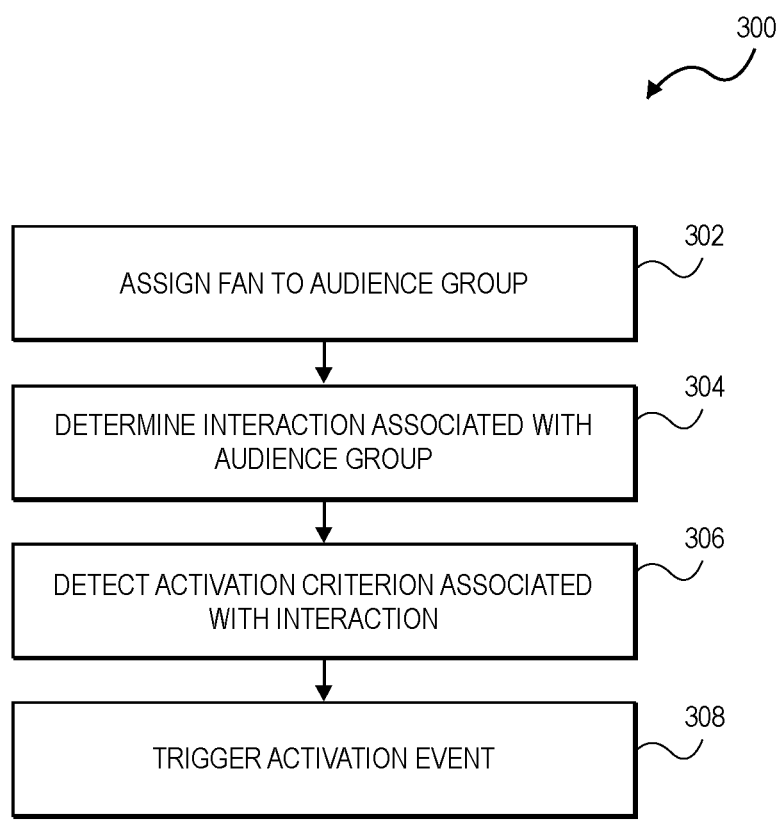
FIG. 3 depicts a flowchart showing the operation of a second method in accordance with embodiments of the invention.

Turning now to FIG. 3, a flowchart depicting another method in accordance with embodiments of the invention is depicted and referred to generally by reference numeral 300. Broadly speaking, the method of flowchart 300 improves the fan experience by systematizing fan interactions that are intuitive but previously technologically infeasible to automate. For example, it is intuitive that a fan who has purchased food at a sporting event might also like beer. However, in a context where beer is sold in a separate tent from food, it may be difficult to identify the relevant group of fans to make the offer. Similarly, if it is raining, it is intuitive to offer fans who have previously purchased merchandise a discount on umbrellas. However, offering the discount to all fans in the stadium may be both overly broad (because some fans in the stadium will not have previously purchased merchandise) and overly narrow (because fans outside the stadium may also quality and need an umbrella).

Initially, at a step 302, a fan is assigned to one or more audience groups based on a datum or data associated with the fan. The term fan is used herein for ease of comprehension; however, it is contemplated that embodiments of the invention can be used in any context with a live audience of an event at a venue. Some audience members may be physically present at the event; other audience members may be viewing (or otherwise following) the event remotely. In some embodiments, audience members may be those who have attended, viewed, or otherwise followed similar or related events in the past, but are not attending, viewing or otherwise following the even event in question. Any or all of these audience members may be referred to as fans herein, even if this is the first event attended, viewed, or otherwise followed by the audience member.

As used herein, the term audience group describes a type, category, or group of fans who are similar in some way. Audience groups may be durable or transient. For example, fans who have a birthday upcoming might be one audience group, while past or present season ticket holders might be another audience group. Fans may change memberships in audience groups based on context. For example, a fan may be a member of a "tourist" audience group when attending an out-of-town event, but not while viewing a local (to the fan's home location) event on that same trip. A fan may be a member of one or more than one audience group for the same event. For example, a parent of a youth soccer player may be a member of a "season ticker holder" audience group for the team as well as a member of a "player parent" audience group. An audience group may have any number of fans as members or may have only a single fan as a member.

As described above, audience groups may be durable or transient. Fans may be also assigned to audience groups durably or transiently. For example, one audience group might be "travelling fan of the visiting team" for a particular home team. The group itself might be durable, with appropriate fans added to the group for a road series and removed once the road series is completed. Similarly, if membership in a particular audience group is predicated on making a purchase at the venue (for example, player merchandise or food), then fans who make appropriate purchases can be added to the particular audience group in real time.

In some embodiments, audience groups may be tracked, altered or determined using a mobile application on a smartphone of the fan. For example, a fan may be added to an "at the venue" audience group if the mobile application determines that they have entered a geofenced area corresponding to the event venue. Similarly, if a fan makes a purchase using their smartphone (or uses their smartphone to activate a discount or coupon for a purchase) this can be detected and serve as a trigger for adding the fan to an appropriate audience group. Still further, a fan may have tickets (and/or season tickets) accessible via their smartphone. This both encourages the fan to activate the mobile application and allows the fan to be added to the relevant ticket-holding audience groups.

Next, at a step 304, an interaction associated with the audience group is determined. Broadly speaking, an interaction includes an audience group, an activation criterion (or criteria), and an activation event. Thus, if a member of the audience group meets the activation criterion (or criteria), then the activation event is triggered. As a concrete example of this process, consider a fan who, having purchased their first in-venue ticket is added to the audience group "long-time fan, first-time attendee." Whenever a member of this audience group meets the activation criterion of entering the venue, a welcoming activation event is triggered. For example, the fan may be offered a discount on fan merchandise (such as a team-branded scarf or an event T-shirt) and navigation assistance to a merchandise vendor and then to their seat (as determined by their ticket information).

In some embodiments, interactions are predetermined by subject-matter experts and stored in a database of such interactions for later triggering. In other embodiments, interactions may be determined via machine learning based on associations. For example, it may be determined based on observations of fan behaviors that fans of a particular player are more likely to purchase merchandise if that player makes a major play. To reinforce this trend an interaction can be added with an audience group of "fans of player X," an activation criterion of "player X scores a goal," and an activation event of "offer a 20% discount on player X merchandise." In some embodiments, the interactions are added for one or more individual players; in other embodiments, a generic interaction is added that can be applied to any player.

At step 306, an activation criterion is detected corresponding to the interaction of step 304. As described above, activation criteria may be detected by a mobile application on a smartphone of a fan. For example, the fan entering the stadium or making a purchase could be an activation criterion for an interaction. Alternatively or in addition, ambient conditions may be activation criteria, such as the weather in or around the venue or the traffic inbound to our or outbound from the event venue. In still other embodiments, events or conditions at the venue may be activation criteria. For example, the game score (or which team is winning), key plays, merchandise inventory levels, or complaints about conditions may all serve as activation criteria as well. In some embodiments, interactions may have multiple activation criteria. For example, if the fan belonging to the audience groups "fans of player X" is detected leaving the event venue, but the outbound traffic is heavy, an activation event may be triggered suggesting that the fan stop by a signing featuring player X. Similarly, if a fan belonging to the audience groups of "in-person attendees" is outside the venue and the event has started, an activation event of popping up a feed on the event may be triggered.

In response to the activation criterion and the determined interaction, an activation event is triggered at step 308. Broadly speaking, an interaction event is any event that collects additional data on the fan, make a sale to the fan, or improves the fan experience in any other way. As described above, a wide variety of activation events are contemplated. Advertisements and discounts may be pushed to the fan via the mobile phone. Information may be solicited or collected to better classify the fan into future audience groups. For example, if the fan purchases a beer, they may be prompted to enter a birth date or capture an image of a government-issued photographic identification to verify their age. The birthday obtained vis this process can then be used to add the fan into an "upcoming birthday" audience group at the appropriate time, which can in turn have an activation condition indicating that a discount on merchandise or a free snack should be offered to the fan if they are at the venue during their member ship in the group. Similarly, an activation event may be an event that simply improves the fan's experience. For example, if a user belongs to a "fans of player X" audience group, and the fan is in proximity (in time and/or space) to a meet-and-greet by player X, the fan may be notified of the event (and/or provided a ticket) so that they have the option to attend.

Although the invention has been described with reference to the embodiments illustrated in the attached drawing figures, it is noted that equivalents may be employed and substitutions made herein without departing from the scope of the invention.

The invention claimed is:

1. A computer-implemented method for improving a fan experience at a venue of a sporting event, the computer-implemented method executed by at least one processor executing instructions stored on non-transitory computer-readable media, the computer-implemented method comprising:

obtaining, from a fan profile, a datum associated with a fan of the sporting event;

assigning the fan to an audience group at the sporting event based at least in part on the datum;

determining a likelihood of obtaining an attribute of the fan;

wherein the likelihood is based on the datum associated with the fan, a most likely time to obtain the attribute, and historical data comprising a history of obtaining attributes, wherein the most likely time is indicative of an increased likelihood of obtaining the attribute based on the historical data comprising the history of obtaining the attributes;

communicating with a plurality of mobile devices of a plurality of fans;

communicating with a mobile device of the fan;

obtaining movement tracking data of the fan from the mobile device and the plurality of mobile devices, wherein the movement tracking data is obtained at the sporting event;

prioritizing obtaining the attribute from the fan over the plurality of fans based on a progress of the sporting event and the movement tracking data of the fan, relative to the plurality of fans;

obtaining the attribute from the fan based on the prioritizing and the likelihood of obtaining the attribute;

determining an interaction associated with the audience group and the venue of the sporting event, wherein the interaction comprises an activation criterion for the fan and an activation event, wherein the activation event is based on the attribute of the fan;

receiving a first notification that an action by a player in the sporting event has occurred satisfying the activation criterion;

responsive to detecting the action by the player satisfying the activation criterion, triggering the activation event for the fan; and transmitting to the mobile device of the fan, the activation event comprising a second notification comprising an in-venue promotion that is redeemable by the fan at an in-venue location in the venue of the sporting event, wherein the in-venue location and the in-venue promotion are specified in the second notification.

2. The computer-implemented method of claim 1, wherein the activation criterion is a first activation criterion, and wherein a second activation criterion comprises at least one of detecting a location of the fan or an ambient event, wherein the ambient event is one of weather conditions near the venue, or traffic conditions near the venue.

3. The computer-implemented method of claim 2, wherein the mobile device is a smartphone, and wherein the location of the fan is determined via a Global Positioning System (GPS) receiver of the smartphone associated with the fan.

4. The computer-implemented method of claim 1, wherein the datum associated with the fan is received and the fan is assigned to the audience group in real time.

5. The computer-implemented method of claim 1, wherein the activation event further comprises offering a discounted price on a purchase by the fan.

6. The computer-implemented method of claim 1, wherein the datum associated with the fan comprises a demographic datum associated with the fan.

7. The computer-implemented method of claim 1, wherein the interaction comprises a plurality of activation criteria.

8. A system for improving a fan experience in a venue at a sporting event, comprising:
a data store storing a plurality of interactions, an interaction of the plurality of interactions comprising an audience group for the interaction, movement data indicative of movements of each member of the audience group, an activation criterion for the interaction, and an activation event for the interaction; and
a smartphone associated with a fan at the sporting event, comprising:
at least one processor;
a display; and
one or more non-transitory computer-readable media storing computer-executable instructions that, when executed by the at least one processor, perform a method of improving the fan experience, the method comprising steps of:
receiving a datum associated with the fan;
determining, based at least on the datum, the audience group for the fan at the sporting event;
determining a likelihood of obtaining an attribute of the fan;
wherein the likelihood is based on the datum associated with the fan, a most likely time to obtain the attribute, and historical data comprising a history of obtaining attributes,
wherein the most likely time is indicative of an increased likelihood of obtaining the attribute based on the historical data comprising the history of obtaining the attributes;
tracking movement of the fan at the sporting event;
prioritizing obtaining the attribute from the fan based on a progress of the sporting event, and the movement of the fan, relative to the movements of the audience group;
obtaining the attribute from the fan based on the prioritizing and the likelihood of obtaining the attribute;
retrieving, from the data store, a fan interaction for the fan at the venue of the sporting event,
wherein the audience group for the fan interaction matches the audience group for the fan at the sporting event;
receiving, from the data store, a first notification that an action by a player in the sporting event has occurred satisfying the activation criterion;
triggering the activation event for the fan interaction responsive to the first notification,
wherein the activation event is based on the attribute;
receiving the activation event comprising a second notification comprising an in-venue promotion that is redeemable by the fan at an in-venue location in the venue of the sporting event,
wherein the in-venue location and the in-venue promotion are specified in the second notification.

9. The system of claim 8, wherein:
the smartphone for the fan further comprises a transponder selected from a set consisting of a WiFi transceiver, a Bluetooth beacon, and a radio frequency identification tag; and
wherein detecting that the activation criterion for the fan interaction has been satisfied is performed based on detecting the transponder in proximity to a known location.

10. The system of claim 8, wherein the computer-executable instructions are further operable to receive the datum associated with the fan and assign the fan to the audience group in real time.

11. The system of claim 8, wherein the activation event comprises offering a discounted price on a purchase by the fan via the display of the smartphone.

12. The system of claim 8, wherein the datum associated with the fan comprises a demographic datum associated with the fan.

13. The system of claim 8, wherein the interaction comprises a plurality of activation criteria.

14. One or more non-transitory computer-readable media storing computer-executable instructions that, when executed by at least one processor, perform a method of improving a fan experience at a venue of a sporting event, the method comprising:
receiving a datum associated with a fan;
assigning the fan to an audience group at the sporting event based at least on the datum;
determining a likelihood of obtaining an attribute of the fan;
wherein the likelihood is based on the datum associated with the fan, a most likely time to obtain the attribute, and historical data comprising a history of obtaining attributes,
wherein the most likely time is indicative of an increased likelihood of obtaining the attribute based on the historical data comprising the history of obtaining the attributes;
communicating with a plurality of mobile devices of a plurality of fans;
communicating with a mobile device of the fan;
obtaining movement tracking data of the fan from the mobile device and the plurality of mobile devices,
wherein the movement tracking data is obtained at the sporting event;
prioritizing obtaining the attribute from the fan over the plurality of fans based on a progress of the sporting event and the movement tracking data of the fan and the plurality of fans;
obtaining the attribute from the fan based on the prioritizing and the likelihood of obtaining the attribute;
determining an interaction associated with the audience group and the venue of the sporting event,
wherein the interaction comprises an activation criterion for the fan and an activation event;
receiving a first notification that an action by a player in the sporting event has occurred satisfying the activation criterion;
responsive to detecting the action of the player satisfying the activation criterion, triggering the activation event for the fan,
wherein the activation event is based on the attribute; and transmitting to the mobile device of the fan, the activation event comprising a second notification comprising an in-venue promotion that is redeemable by the fan at an in-venue location in the venue of the sporting event.

15. The media of claim 14, wherein the audience group comprises the plurality of fans.

16. The media of claim 14,
wherein the activation criterion is a first activation criterion, and
wherein a second activation criterion comprises detecting a customer interaction with the fan at a known location,
wherein the customer interaction is selected from a set consisting of: scanning a loyalty card associated with the fan, scanning a mobile ticket associated with the fan, interacting with the fan at a point-of-sale system, and receiving a facial recognition event associated with the fan.

17. The media of claim 14, wherein the datum associated with the fan is received and the fan is assigned to the audience group in real time.

18. The media of claim 14, wherein the datum associated with the fan comprises a demographic datum associated with the fan.

19. The media of claim 14, wherein the activation event comprises offering a discounted price on a purchase by the fan.

20. The media of claim 14, wherein the interaction comprises a plurality of activation criteria.

* * * * *